Nov. 25, 1947.  T. ULRICH ET AL  2,431,524
VEHICLE BODY UNDERFRAME OR CHASSIS
Original Filed Aug. 2, 1940
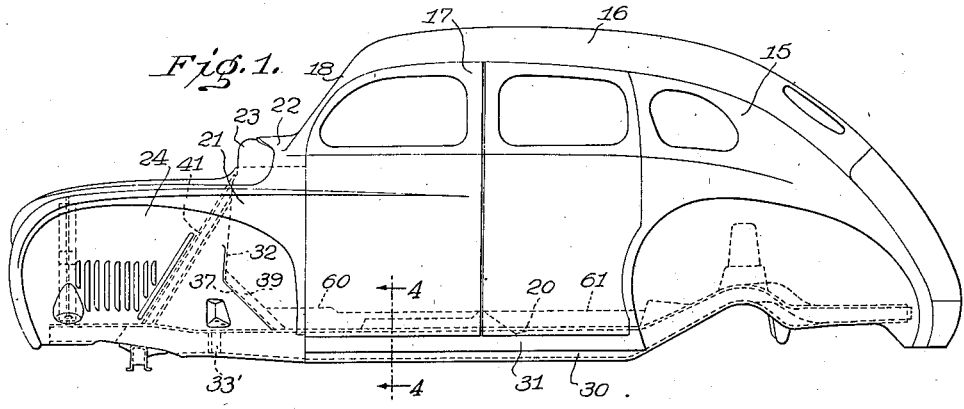
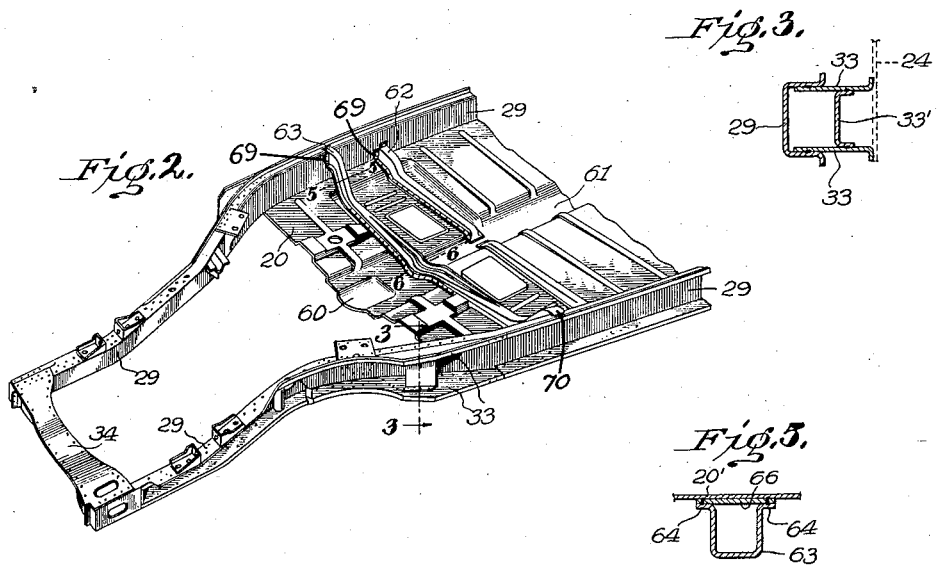
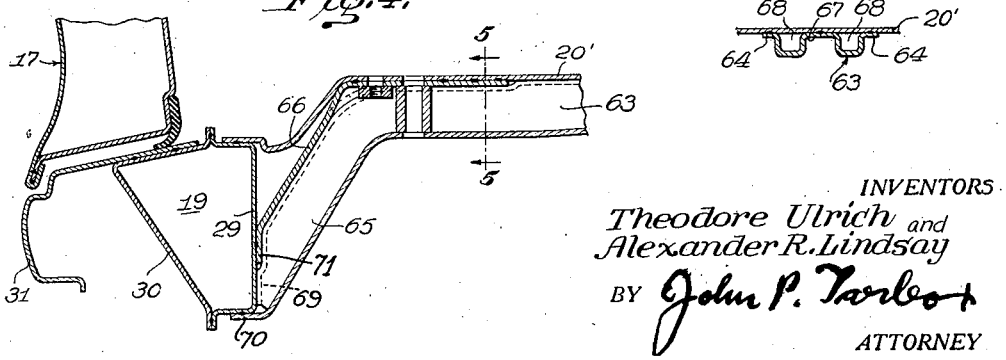
INVENTORS
Theodore Ulrich and
Alexander R. Lindsay
BY John P. Tarbot
ATTORNEY Patented Nov. 25, 1947

2,431,524

UNITED STATES PATENT OFFICE 2,431,524

VEHICLE BODY UNDERFRAME OR CHASSIS

Theodore Ulrich, Milwaukee, Wis., and Alexander R. Lindsay, Detroit, Mich., assignors to The Budd Company, a corporation of Pennsylvania Original application August 2, 1940, Serial No. 349,704. Divided and this application February 9, 1942, Serial No. 430,060

11 Claims. (Cl. 296—28)

The invention refers to improvements in the construction of vehicles in general and of vehicle bodies in particular, and more specifically to improvements in the body underframe and chassis construction of a vehicle.

This application is a division of application Serial No. 349,704, of Deisley, Ulrich, and Lindsay for "Vehicle structure, especially vehicle front end structure," filed August 2, 1940, now Patent No. 2,380,031, issued July 10, 1945.

It is among the objects of the invention to improve vehicle bodies such as automobile bodies in general and more particularly bodies of the self-sustaining type, that is, of the type which act as their own chassis.

Among the objects of the invention are improved reinforcements of the floor panel of a body, such as a self-sustaining body, and improvements of the side sills, particularly in the region of or near to the cowl and the front seat.

With these and other objects in view, the invention consists among others in a peculiar formation of longitudinal side sill structures in the region of a sharp offset, which structure may preferably be used in connection with inclined members and a transverse wall so as to attain a very strong foundation for these members and a foundation for adjoining body door posts.

Other features of the invention consist in the formation of cross braces and their arrangement in an upwardly offset portion of the floor pan in such a manner as to increase the ground clearance and to make room for the longitudinal driving shaft.

Further objects, advantages and features of the invention will become apparent from the following description of an embodiment of the invention when read in conjunction with the attached drawings.

In the drawings:

Figure 1 is a diagrammatic side elevation of a four-door vehicle body of the self-sustaining type, the running gear, the automotive organs and certain other parts, such as the motor hood, being omitted;

Figure 2 is a fragmentary perspective view of the underside of the vehicle underframe front end structure;

Figure 3 is a section along line 3—3 of Figure 2;

Figure 4 is a fragmentary section through the body structure at a larger scale, along line 4—4 of Figure 1;

Figure 5 is a fragmentary section through a transverse bottom member along line 5—5 of Figures 2 and 4; and Figure 6 is a section through the same transverse member as shown in Figure 5 and on the same scale but taken along line 6—6 of Figure 2.

The illustrated body comprises as main elements side walls 15, a roof 16, doors 17, a front wall with a windshield 18, longitudinal side sill structures 19 and a floor panel or underpan 20.

The forward portion of the side walls 15 form the side walls 21 of a cowl, the upper ends of these cowl side walls being interconnected by a cowl top 22, the front margin of this cowl top extends downwardly at 23, the cowl sides 22 being extended forwardly as to form side walls 24 of a motor compartment and at the same time the skirts of front wheel housings.

The lower margins of the body side wall panels 15, the cowl side 21 and the side wall extension 24 are reinforced and supported by the beforementioned longitudinal side sill structures 19. These box-sectional structures comprise an outwardly facing channel member 29 which is, by marginal flanges, fastened in the region of the doors 17 to an inwardly facing channel-shaped member 30, likewise provided with marginal flanges. This member 30 may form an integral part of a so-called monopiece side panel stamping. A further threshold member 31 which has its outer portion merging into the contour of the doors 17 is attached to the member 30 either permanently or, so as to facilitate its replacement in case of an accident, detachably.

In the region of the cowl sides 21 and of the rear portion of the wheel housing walls 24, the upper and lower walls of the sill members 29 are widened by webs or plates 33. The outer marginal flanges of the plates merge into the flanges of the sill members 29. The main bodies of the plates are welded to the sill walls and are interbraced by a member 33'. The open sides of the front portions of the sill members 29 and of the sill extensions 33 are closed by the lower margins of the cowl sides 21 and the wheel housing portions 24, and the sill members 29 are interconnected at their forward ends by a strong transverse beam 34.

The use of the extension plates 33 results in a so-called bottle-neck frame without the relatively sharply offset through running side sill members which are difficult to manufacture. The sill members 29, which may extend in one piece to the rear end of the car are comparatively simple and shallow in form.

The shroud pan or panel 32 has its main portion arranged in a substantially vertical transverse plane and has its upper margin fastened to the cowl top portion 23. The shroud pan is, furthermore, provided with a downwardly and rearwardly extending lower portion 37 which forms the toe board and which has its lower, about horizontal marginal portion, overlapped and fastened to the forward end of the floor panel 20 proper. 39 is an offset of the panel portion 37 which makes room for the gear box and the coupling and which may form a removable cover. The shroud pan 32 and the toe board 37 have their side margins shaped so as to conform and to snugly fit over their entire length against the cowl sides 21 and the wheel housing walls 24, and these margins are each provided with a flange 40 which extends in the longitudinal direction of the body, and overlaps and is fastened to said wall portions such as by electric spot welding.

An elongated bracing member 41 of sheet material is arranged on either side of the longitudinal vertical middle plane of the body in a transverse plane which is inclined toward the transverse vertical middle plane of the body.

The portion 39 of the toe board 37 extends into the forward part of the floor panel 20 at 60 and into a longitudinally extending raised floor panel portion or tunnel 61 for the longitudinal driving shaft (not shown).

So as to further strongly reinforce the body in its lower section shortly behind the location of the shroud pan 32 and the inclined braces 41, a pair of cross braces, rails or transverse beam structures 62, 63 are arranged beneath an upwardly offset transverse section or portion 20' of the floor panel 20 which offset section forms the support for the driver's seat (not shown).

The offset portion 20' extends transversely from points adjacent the lateral margins of the floor pan over the latter's entire width and in longitudinal direction of the body over a shorter distance than in transverse direction. The vertical thickness of the transverse beam structures or braces 62, 63 is less than the height of said sill structures, and the height of the raised section 20' above the normal height of the adjoining portions of the floor pan relative to the vertical thickness of the beams or braces 62, 63 is such that at least the larger part of the latter is above the normal-height portions of the floor pan. This increases the ground clearance as compared with structures having the cross braces arranged beneath a normal-height floor pan portion. The longitudinally extending raised floor panel portion or tunnel 61 projects above the offset 20' and the braces or beams have their middle portion shaped upwardly and nested in this upwardly arched tunnel portion.

The beam 63 consists near its ends of a channel or U-shaped member with marginal flanges 64 and having its open side facing upwardly. The extreme end portions 65 of the member 63 are downwardly and outwardly inclined, and the open sides are each closed by a reinforcing plate 66 and the floor panel portion 20', respectively. In its middle portion, the height of the member 63 is reduced but, so as to compensate for the loss of strength going with such reduced height, the width is considerably increased and the middle portion of the bottom wall of the original U-section is offset at 67 so that in effect a pair of U-sections 68 is formed—see Figures 5 and 6. This flattening and widening of the middle portion of the sill 63 allows a comparatively low arrangement of the body flooring because it does not obstruct the longitudinal driving shaft. The flanges 64 and the offset 67 are fastened, such as by welding, to the floor panel 20 and reinforcing plates 66, the welds being indicated by small crosses on the outside views and by dots at the interfaces on the sectional views.

The additional transverse beam 62 is made from two sections, each of flanged channel form, the two sections being spaced from each other in the middle portion for the purpose of allowing the driving shaft to pass between them. The ends of the sills 62, 63 and of the members 66 overlap and are fastened to the inner and lower walls of the sill members 29 by overlapping tongues 69, 70 and 71. For the formation of the tongues 69, 70 and 71 the side walls of the sills of channel-shaped cross section are bent outwardly at the ends. The welds for this connection are likewise indicated by small crosses in Figure 2 and by dot between the tongue 70 and the member 29 in Figure 4.

While the shown and described embodiments are designed for sheet metal bodies, it is obvious that the invention is also applicable to bodies which are built up partly or completely from other materials suited for the purpose. It is moreover obvious that the invention is not necessarily restricted to a compartment at the front end of an automobile but is also applicable to a compartment in the rear of the body and, furthermore, applicable to certain other types of vehicles apart from automobiles. All such possible applications and many other modifications are intended to be covered by the language and spirit of the following claims.

What is claimed is:

1. In a vehicle understructure, a floor panel, a transverse upwardly facing rail U-shaped in cross section having the upper margins of its side walls fastened to the underside of said floor panel, the depth of said U-section rail being considerably reduced for part of the rail's length but the width being considerably increased in this region of reduced depth, the U-section of said rail being divided into two U-section portions in the region of reduced depth by a longitudinal offset in the bottom wall of the rail whereby the side wall area in the region of reduced depth approximates that of the region of normal depth.

2. In a vehicle underframe structure, a floor panel, a transverse upwardly facing rail U-shaped in cross section having the upper margins of its side walls fastened to the underside of said floor panel, the depth of said U-section rail being considerably reduced for part of the rail's length but the width being considerably increased in this region of reduced depth, the U-section of said rail being divided into two U-section portions in the region of reduced depth by a longitudinal offset in the bottom wall of the rail, said offset being likewise fastened to the underside of said floor panel so as to provide for two closed box sectional structures in the region of reduced depth.

3. In a vehicle construction, a cross rail for resisting transverse bending moments comprising a member having single end and multiple center sections, the cross section of each of said end and center rail sections being channel shaped, the channels having their mouths facing in the same direction and their free edges adapted for attachment to a load receiving plate, and the side wall area of the end and center rail sections being approximately the same.

4. In a metal automobile body, an underpan, a box-sectional construction at each side of the underpan, a raised section of the pan under the front seat of the body, a transverse brace under and abutting the pan at the raised part, said brace interconnecting the box sections, and an upwardly directed arch in the brace at the middle thereof to allow clearance for the propeller shaft.

5. In a vehicle body structure: a longitudinal side sill of outwardly facing channel section following for the greater part of its length substantially the curved outline of the lower side edge of the body so as to adapt it for the direct attachment of the lower margin of the body side wall; the side walls of said sill being outwardly widened by separately manufactured webs in a region where the lower edge of the body side wall abruptly changes its direction so that the side sill may run in this region on a smooth curve at a distance from but be connected through said webs with the edge of the body.

6. In a structure according to claim 5, an upright bracing member inserted between the upper and lower widening webs in a region spaced from the outer margins thereof and from the bottom wall of the side sill.

7. In an automobile body having side sill members, a floor pan, a pair of cross braces of upwardly opening channel-shaped cross sections with flanges turned outwardly from their upper edges and fastened to the floor pan and their side walls bent outwardly at the ends and fastened to said side sill members, said floor pan having a portion arched upwardly over the longitudinal center thereof and a transverse raised section, one of said transverse section and said arched portion extending higher than the other and longitudinally over the intersection with said cross braces which are shaped upwardly to nest within the higher one of said portion and section of said floor pan.

8. In an automobile body having side sill members, a cross brace having upwardly opening channel-shaped cross section, flanges turned outwardly from the upper edge of said channel-shaped cross section, the side walls of said channel-shaped cross section being bent outwardly at the ends of said cross brace and fastened to said side sills, a floor pan for said body positioned over said cross brace and fastened to the flanges of said brace, a portion of said floor pan being offset upwardly and a section over the longitudinal center of said floor pan raised above the offset portion thereof and extending longitudinally over the intersection with said cross brace, said cross brace having a portion between its ends offset upwardly to nest within said offset portion and raised section of said floor pan.

9. In an automobile body having side sill members, a floor pan, at least one cross brace of upwardly opening channel-shaped cross section with flanges turned outwardly from its upper edges and fastened to the floor pan and its side walls bent outwardly at the ends and fastened to said sill members, said floor pan having a portion arched upwardly over the longitudinal center thereof and a transverse raised section, one of said transverse section and said arched portion extending higher than the other and longitudinally over the intersection with said cross brace which is shaped upwardly to nest within the higher one of said portion and section of said floor pan.

10. In an automobile body, a floor pan, longitudinal sill structures integrally connected with and downwardly projecting from the lateral margins of said floor pan, said floor pan having portions arranged at a normal height and having also a raised section which extends transversely from points adjacent the lateral margins of the floor pan over the latter's entire width and in longitudinal direction of the body over a shorter distance than in transverse direction, a transverse brace of a vertical thickness less than the height of said sill structures arranged beneath and secured to the underside of the raised section of said floor pan, said brace having downwardly and outwardly inclined end portions which extend downwardly beyond the raised portion of the floor pan and are secured to said sill structures, the height of the raised section above the normal height of the floor pan and the vertical thickness of the cross brace being such that at least the larger part of the cross brace is above the normal height portions of the floor pan.

11. In an automobile body, a floor pan provided with longitudinal reinforcements along its lateral margins and having a raised section, said raised section extending from regions adjacent said reinforcements over the width of the floor pan and having greater width transversely than length longitudinally of the body, a transverse brace under and abutting the raised section and interconnecting said reinforcements, the heights of said raised section and of said brace being such that at least a major portion of said brace is located in the raised portion thereby increasing the ground clearance.

THEODORE ULRICH.
ALEXANDER R. LINDSAY.

REFERENCES CITED

The following references are of record in the file of this patent:

UNITED STATES PATENTS

| Number | Name | Date |
|---|---|---|
| 910,192 | Grouvelle et al. | Jan. 19, 1909 |
| 1,290,939 | Dyke | Jan. 14, 1919 |
| 1,441,854 | Heintz | Jan. 9, 1923 |
| 1,558,239 | Costello | Oct. 20, 1925 |
| 1,654,107 | Andren | Dec. 27, 1927 |
| 1,778,507 | Paul | Oct. 14, 1930 |
| 2,122,444 | Tjaarda | July 5, 1938 |